США008456353B2

United States Patent
Dai et al.

(10) Patent No.: US 8,456,353 B2
(45) Date of Patent: Jun. 4, 2013

(54) METHOD AND SYSTEM FOR DETERMINING CLOCK CORRECTIONS

(75) Inventors: Liwen L. Dai, Chino Hills, CA (US); Michael A. Zeitzew, Redondo Beach, CA (US); Yiqun Chen, Torrance, CA (US); Yujie Zhang, Lomita, CA (US)

(73) Assignee: Deere & Company, Moline, IL (US)

( * ) Notice: Subject to any disclaimer, the term of this patent is extended or adjusted under 35 U.S.C. 154(b) by 224 days.

(21) Appl. No.: 13/109,025

(22) Filed: May 17, 2011

(65) Prior Publication Data

US 2012/0182181 A1 Jul. 19, 2012

Related U.S. Application Data

(60) Provisional application No. 61/432,646, filed on Jan. 14, 2011.

(51) Int. Cl.
*G01S 19/41* (2010.01)

(52) U.S. Cl.
USPC .................................... 342/357.24

(58) Field of Classification Search
USPC .................................... 342/357.24
See application file for complete search history.

(56) References Cited

U.S. PATENT DOCUMENTS

| | | | |
|---|---|---|---|
| 5,600,329 A | 2/1997 | Brenner | |
| 5,736,960 A | 4/1998 | Murphy et al. | |
| 5,828,336 A | 10/1998 | Yunck et al. | |
| 5,931,889 A | 8/1999 | Misra | |
| 7,117,417 B2 | 10/2006 | Sharpe et al. | |
| 7,710,316 B1 * | 5/2010 | Zhodzishsky et al. | ... 342/357.31 |
| 2005/0024263 A1 | 2/2005 | Sharpe | |
| 2008/0152060 A1 | 6/2008 | Mudrak et al. | |

FOREIGN PATENT DOCUMENTS

WO 2011034614 A2 3/2011

OTHER PUBLICATIONS

Kuang, D., Bar-Sever, Y.E., Bertiger, W.I., Hurst, K.J., Zumberge, J.F. GPS-assisted GLONASS orbit determination Journal of Geodesy, vol. 75, No. 11 (Nov. 2001), pp. 569-574.

Bednarz, S.G. Adaptive modeling of GPS receiver clock for integrity monitoring during precision approaches. Thesis (S.M.)—Massachusetts Institute of Technology, Dept. of Aeronautics and Astronautics, 2004. Retrieved from the Internet:<http://dspace.mit.edu/handle/1721.1/17756>.

(Continued)

*Primary Examiner* — Harry Liu

(57) ABSTRACT

A satellite clock error is determined for each navigation satellite based on the pseudo-range code measurements, the carrier phase measurements, and broadcast satellite clock errors provided by a receiver network. Differences are determined between the computed satellite clock errors and the broadcast clock errors for each satellite. For each constellation, a clock reference satellite is selected from among the navigation satellites, where the clock reference satellite has the median value of clock error difference for that satellite constellation. A correction is determined for the broadcast clock error by applying a function of the reference satellite's clock error to the broadcast clock error for each satellite in the one or more constellations.

25 Claims, 6 Drawing Sheets

OTHER PUBLICATIONS

Iz. H.B et al. The Stochastic Estimation of Satellite Correction Information in WADGPS. Geo-spatial Informational Science, vol. 3, No. 1, p. 66-69, Mar. 2000. Retrieved from the Internet <http://elearning.isgi.org/portfolio/the%20stochastic%20estimation%20of%20satellite%20clock%20correction%20information%20in%20wadgps.pdf>.

Weiss, M. et al. Performance of the Kalman Filter of the Global Postionlng System Operational Control Segment. 29th Annual Precise Time and Time Interval (PTTI) Meeting. Jan.-Mar. 1997. Retrieved from the Internet:<http://www.pttimeeting.org/archivemeetings/1997papers/Vol%2029_15.pdf>.

International Search Report and the Written Opinion of the International Searching Authority dated Apr. 4, 2012 (4 pages).

* cited by examiner

METHOD AND SYSTEM FOR DETERMINING CLOCK CORRECTIONS

This document claims priority based on U.S. provisional application Ser. No. 61/432,646, filed on Jan. 14, 2011 and entitled METHOD AND SYSTEM FOR DETERMINING CLOCK CORRECTIONS, under 35 U.S.C. 119(e).

FIELD OF THE INVENTION

This invention relates to a method and system for determining clock corrections for a satellite navigation system.

BACKGROUND OF THE INVENTION

A location-determining receiver, such as a Global Navigation Satellite System (GNSS) receiver, can estimate the position and velocity of an object or a vehicle. The location-determining receiver may derive imprecise positions and velocities due to inaccurate clock data from one or more satellites. GNSS augmentation systems that distribute corrections for GNSS errors provide user receivers with information that enables more accurate navigation than otherwise possible. Such augmentation systems typically include clock and orbit corrections to the transmitted satellite clock and orbit information.

A GNSS augmentation system typically includes a network of receivers at known locations. These receivers transmit information to a Processing Center, where the information is combined and GNSS corrections are computed. Because each receiver in the augmentation system network typically has its own local clock that is not synchronized with the other network clocks, it is necessary to have a single time source to which all the information from the network receivers can be referenced.

Under a prior art approach, at one or more network receivers, a precise clock (typically an atomic clock external to a network receiver) is used to supply timing signals to a network receiver. Such a network receiver thus has a very stable timing reference, and that network receiver can be used as the single time source to which the information from the other network receivers can be referenced. Because of the possible failure of the precise clock or the failure of communication links between this network receiver and the Processing Center, several precise clocks are usually deployed to improve the system reliability. The performance of these precise clocks is typically evaluated and monitored in real-time to facilitate switching between precise clocks.

In practice, this prior art approach requires expensive atomic clocks to be located at several different sites with network receivers. Thus, there is a need for an improved economical method and system for determining clock corrections for a satellite navigation system. In particular, there is a need for a method and system for determining clock corrections that does not require a precise clock at any network receiver.

SUMMARY OF THE INVENTION

In accordance with one embodiment, a method and system for determining satellite clock corrections facilitates the determination of accurate position estimates by one or more mobile location-determining receivers. The method and system comprises collecting pseudo-range code measurements, carrier-phase measurements, and navigation message data (e.g., broadcast clock error data or broadcast clock offset) from a network of stationary receivers of satellite signals transmitted by one or more constellations of navigation satellites. At each time interval (e.g., an epoch), a clock error is computed for each navigation satellite based on the collected pseudo-range code measurements, the carrier phase measurements, and the navigation message data. Clock error differences are formed between the computed satellite clock error and the broadcast clock error for each satellite. For each constellation, a clock reference satellite is selected, from among the navigation satellites in that constellation, that has the median value of clock error difference for that satellite constellation. A correction to the broadcast clock error of each satellite in that constellation is then determined by adding a function of the clock reference satellite's clock error to the broadcast clock error for each satellite in that constellation (e.g., on a satellite-by-satellite basis within each constellation). The value of the correction at each epoch or other time interval (e.g., several epochs) is limited based on a control parameter limit (e.g., where the control parameter limit is less than or approximately equal to the clock reference satellite's clock error, or where the control parameter limit comprises a fixed parameter, expressed in distance units, as a Kalman filter solution converges on solution for the broadcast clock error).

DESCRIPTION OF THE PREFERRED EMBODIMENT

In accordance with one embodiment of a system 11 for determining clock corrections for a satellite navigation system (e.g., GNSS system), the system 11 facilitates the real-time determination of accurate and smooth satellite clock corrections to broadcasted satellite clock error data to support enhanced reliability and accuracy of mobile location-determining receivers 42 that can use clock correction data 44 in real-time. The method and system produces clock correction data 44 (e.g., clock error corrections) that is well suited for providing enhanced accuracy and resolution in determining the position or velocity of a mobile location-determining receiver 42, or an associated object, in real-time.

Figure 1:
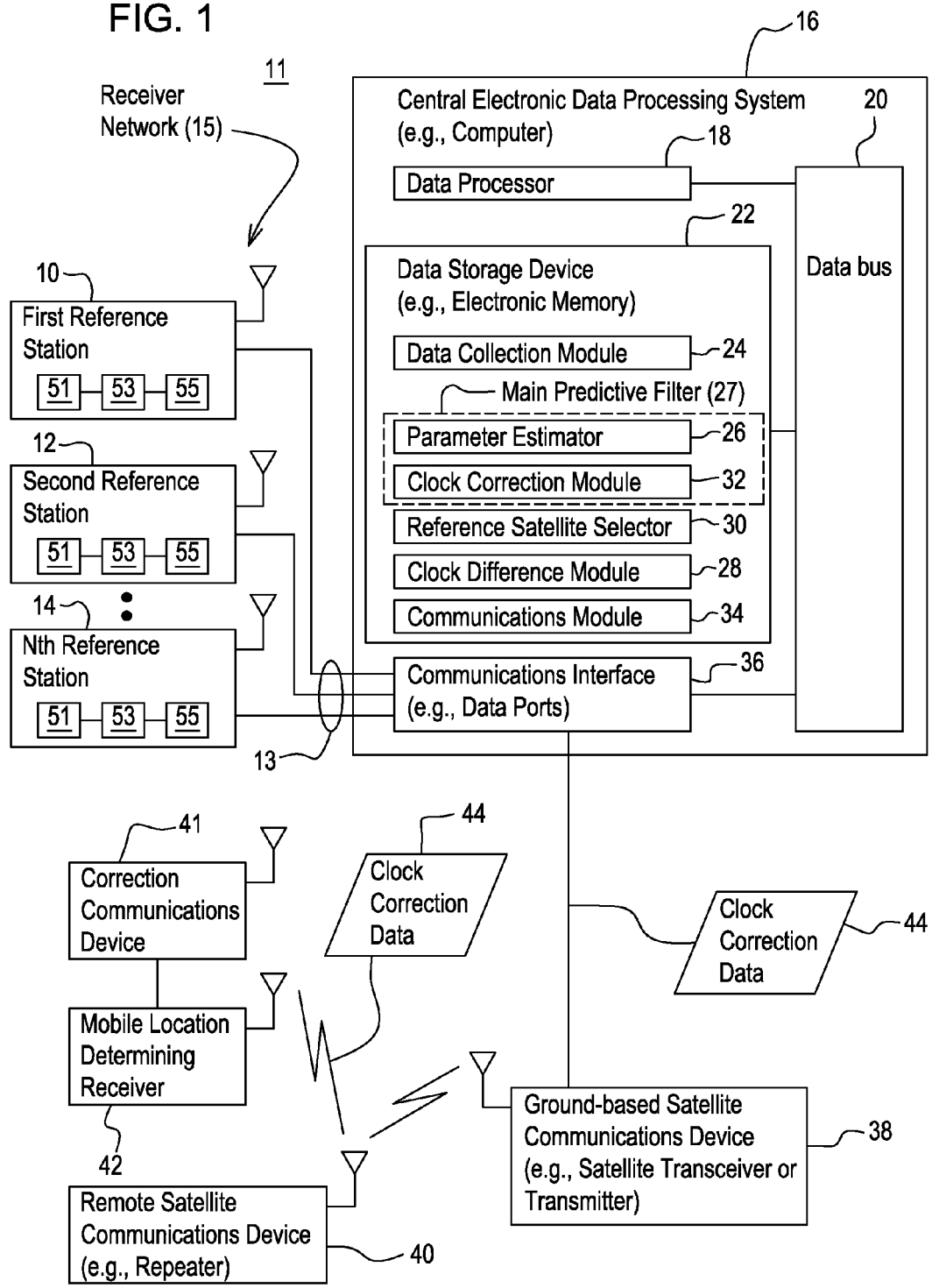
FIG. 1 is a block diagram of a first embodiment of a system for determining clock corrections.

In one embodiment, the system 11 comprises a receiver network 15 that is capable of communication with a central electronic data processing system 16 via one or more communications links 13. The central electronic data processing system 16 is coupled to a ground-based satellite communications device 38 that facilitates the communication of clock correction data 44 or other correction data (e.g., position correction data) to one or more mobile location-determining receivers 42 via a remote satellite communications device 40 (e.g., satellite vehicle) in orbit above the Earth's surface. The mobile location-determining receiver 42 is associated with a correction communications device 41 (e.g., a satellite correction receiver) that is capable of receiving satellite signals (e.g., or clock correction data 44) from the remote satellite communications device 40. Although FIG. 1 illustrates a ground-based satellite communications device 38, a remote satellite communications device 40 and a correction communications device 41 for communicating or distributing correction data, the correction data or correction may be distributed in any manner with electronic communications, telecommunications, electromagnetic signals, or wireless communications.

In one embodiment, the receiver network 15 comprises a first reference station 10 to an Nth reference station 14, where N equals any positive whole number or integer greater than 2. As shown in FIG. 1, the receiver network 15 comprises a first reference station 10, a second reference station 12 and a third reference station where N equals three, for example. In one embodiment, the receiver network 15 may comprise reference stations (10, 12 and 14) that are distributed globally at different known locations (e.g., station geographic coordinates), although regional or local distribution of the reference stations (10, 12 and 14) is possible.

Each reference station (10, 12 and 14) comprises a reference receiver 51 at a respective known or fixed location, a reference electronic data processing system 53, and a transmitter or transceiver 55. Each reference receiver 51 receives or detects one or more of the following: (1) pseudo-range code measurements or data, (2) carrier phase measurements or data, (3) broadcasted satellite clock error data, (4) ephemeris data, and (5) other reference navigation data. The reference receiver 51 may receive satellite signals, carrier signals and encoded signals from one or more Global Positioning System (GPS) satellites, from one or more Global Navigation Satellite System (GLONASS) satellites, or both.

The receiver data processing system 53 may store, retrieve, and process reference navigation data associated with the received satellite signals, carrier signals, and the encoded signals. In one embodiment, the transmitter or transceiver 55 of each reference station (10, 12 or 14) transmits one or more of the following data to a central electronic data processing system 16 or computer hub via one or more communications links 13: (1) pseudo-range code measurements or data, (2) carrier phase measurements or data, (3) broadcasted satellite clock error data, (4) ephemeris data, (5) reference navigation data, and (6) derivative data derived from analysis or processing of any of the foregoing data items. For example, the above transmitted data may relate to a first constellation of navigation satellites (e.g., Global Positioning System (GPS) satellites, a second constellation of satellites (e.g., GLONASS satellites), or both.

The reference navigation data may comprise one or more of the following data items: (a) the respective reference station location or geographic coordinates of each corresponding reference station (10, 12 or 14), (b) the respective antenna geographic coordinates of each reference receiver 51, (c) the respective reference station identifier of each reference station (10, 12 or 14), and (d) the satellite identifiers for the respective satellites that provided the corresponding broadcast clock error data and corresponding ephemeris data.

The communications links 13 support the real-time transmission of data between the reference station (10, 12 or 14) and the central electronic data processing system 16. The communications links 13 may comprise one or more of the following: a data packet network, a data network, a virtual private network, an Internet data communications path, telecommunications equipment, optical communications equipment, radio frequency communications equipment, microwave communications equipment, a fiber optic link, a point-to-point microwave communication link, a dedicated wire line connection, a multiconductor cable, a coaxial cable transmission line, an optical transmission line, a communication line, or other suitable communications links for communicating data in real-time.

The pseudo-range code measurements or data may be decoded by the reference receiver 51 from the information that modulates or encodes the satellite signals that are received by each reference receiver 51.

The carrier phase measurement data may originate from a phase measurement device in the reference receiver 51 that receives one or more carrier signals or data from a receiver front end, for example. In one embodiment, the phase measurement device may provide carrier phase measurements for GPS carrier signals, GLONASS carrier signals, or both.

The ephemeris data comprises satellite orbital information or collection of data on the positions of satellites with reference to from one or more reference positions on or near the Earth's surface in accordance to a schedule of time. The ephemeris data may be stored in a database or in one or more files. Satellites may transmit the ephemeris data in a navigation message that is capable of reception by the reference receiver 51.

In an alternate embodiment, the reference receiver 51 detects carrier phase data or carrier phase measurements associated with one or more carrier signals; the reference data processing system 53 in the reference station (10, 12 or 14) determines an initial carrier phase ambiguity solution or carrier phase ambiguity solution set for multiple satellite signals received at the reference receiver 51. The reference data processing system 53 receives carrier phase data and the initial ambiguity solution corrects it, by using the known or fixed location of the reference receiver 51, to determine an enhanced ambiguity solution. In one example, corrected carrier phase data comprises the estimated carrier phase and the enhanced ambiguity solution, or other data derived therefrom. In turn, the corrected carrier phase data or other correction data is transmitted via a wireless signal or electromagnetic signal to the central data processing system 16.

In one embodiment, the central electronic data processing system 16 comprises a central hub of one or more computers. The central electronic data processing system 16 comprises a data processor 18, a data storage device 22, and a communications interface 36 that are coupled to a data bus 20. The data processor 18 may comprise a microprocessor, a controller, a programmable logic array, an application specific integrated circuit, an arithmetic logic unit, or another device that is suitable for processing data, performing mathematical operations on the data, or performing Boolean logic or arithmetic logic on the data. The data storage device 22 may comprise electronic memory, an optical storage device, a magnetic storage device, or another device that is capable of storing and retrieving data. As shown in FIG. 1, the data storage device 22 stores, supports or interfaces with one or more of the following modules: a data collection module 24, a parameter estimator 26, a main predictive filter 27, a clock difference module 28, a reference satellite selector 30, a clock correction module 32, and a communications module 34. Any of the above modules (24, 26, 27, 28, 30, 32 and 34) in the data storage device 22 may comprise a software module, an electronic module, software instructions, or a hardware or an electronic module to carry out equivalent software instructions. If any of the above modules comprise software instructions or programs, those software instructions or software programs may be stored in the data storage device 22, on an optical storage medium, a magnetic storage medium or another storage medium that is non-transitory or substantially permanent.

In one embodiment, the data collection module 24 provides software instructions for or is capable of collecting, organizing, and managing the processing of pseudo-range code measurements or data, carrier-phase measurements or data, and navigation message data (e.g., including ephemeris and broadcast satellite clock error data) received by a the receiver network 15 that receive signals over multiple frequencies transmitted by one or more constellations of navigation satellites. A constellation of navigation satellites may refer to the GPS constellation, the GLONASS constellation, or other constellations, for example. In one embodiment, the data collection module 24 tracks the above information in a data base, a chart, a file (e.g., an inverted file) or another data structure that allows the reference data to be identified, organized or sorted by reference station identifier or the geographic coordinates of the reference station (10, 12, 14).

The parameter estimator 26 provides software instructions for or is capable of computing or determining a computed satellite clock error data (e.g., clock state data) on an epoch-by-epoch basis for each satellite based on the pseudo-range code measurements or data, the carrier phase measurements or data, the respective known locations of the reference stations (or reference receivers) and the broadcast satellite clock error data. In one configuration, the parameter estimator 26 may compute or determine the computed satellite clock error base on the navigation message data (e.g., which includes the broadcast satellite clock error data) in addition to the pseudo-range code measurements or data, the carrier phase measurements or data, the respective known locations of the reference stations (or reference receivers). In one embodiment, the parameter estimator 26 may comprise, use or access one or more of the following: a hub orbit estimator, a hub clock estimator, a predictive filter, an error-reducing filter, and a Kalman filter.

An epoch may be defined by one or more of the following: a starting time, an ending time, a duration or interval, or a discrete instant when a reference receiver 51 takes a snapshot of incoming radio frequency or microwave ranging signal and a generates pseudo-range/carrier phase measurement. The current epoch refers to the most recent instant when the latest measurement (e.g., GPS measurement) is generated.

The clock difference module 28 provides software instructions for or is capable of forming or determining the clock error differences between pairs of the computed satellite clock error data and the broadcasted clock data for each satellite in one or more constellations. In one embodiment, for each satellite received by the reference receiver 51, the computed satellite clock error is determined or estimated based on carrier phase measurements, pseudo-range code measurements, respective known fixed locations of the reference stations (10, 12, and 14), and broadcast satellite clock error. The clock difference module 28 may compute a first set of computed satellite clock error data with respect to the GPS constellation and a second set of computed satellite clock error data for the GLONASS constellation, or both.

In general, absolute clocks of each satellite and location-determining receiver are unobservable in each Global Navigation Satellite System (GNSS) (e.g., GPS and GLONASS) for orbit and clock determination. At least one additional constraint, such as a pseudo-code measurement or a carrier phase measurement for each global navigation satellite system (GNSS) system, is required to determine precisely the satellite clock error and receiver clock error.

In one embodiment, the broadcast satellite clock error data may represent a clock bias, a clock offset or differential clock data with respect to the respective constellation system clock (e.g., GPS system clock or the GLONASS system clock). The clock difference module 28 or data processing system 16 determines the clock error differences or error data between the computed satellite clock error data and the broadcast clock data for each satellite in each constellation on a satellite-by-satellite basis, or as otherwise limited to particular subsets of satellites within each constellation. The clock error differences or error data may be stored in one or more arrays or matrices in the data storage device 22, where each array corresponds to a particular constellation. Although each array or matrix may cover all of the satellites in a constellation, it is possible that the matrix is confined to a subset of each constellation to improve the data processing through-put time or computational time (e.g., of the data processor 18) required to determine and assemble the computed satellite clock error data or clock error differences at the central electronic data processing system 16 to achieve real-time responsiveness in provision of the correction data (e.g., clock error corrections) to an end user of the mobile location-determining receiver 42. To that end, certain core satellites, such as the AMC-1 satellite or other satellites which have historical accuracy of the satellite clock data within 10 nanoseconds of accuracy with respect to constellation system time (e.g., GPS system time) may be included in the subset group of satellites in each constellation for which differences or error data is computed.

The reference satellite selector 30 provides software instructions for or is capable of selecting (e.g., on a dynamic epoch by epoch basis) one particular satellite per constellation as the clock reference satellite for each constellation, where the clock reference satellite has a median value of the differences formed above for each satellite constellation (e.g., GPS and GLONASS) for a particular respective epoch. For example, the median value may be used rather than the mean value to exclude any erroneous influence or disparate impact of outlying satellite clock data to the resultant error data or differences. If the mean value were used, the resultant error data might be skewed improperly by outlying satellite clock data from an improperly functioning satellite clock.

The clock correction module 32 provides software instructions for or is capable of computing or determining the correction (e.g., clock correction data 44 or satellite clock correction data) to the broadcast satellite clock error data by adding to or adjusting broadcast satellite clock data on a satellite clock-by-satellite clock basis. For example, the clock correction module 32 is adapted to determine clock error corrections by adding a function (e.g., mathematical function, linear algebraic function, or matrix expression) of the clock difference or error data associated with the selected reference satellite to each broadcast satellite clock error of the other satellites in the constellation. In one embodiment, the clock correction module 32 comprises one or more of the following: a predictive filter, an error-reducing filter and a Kalman filter. In another embodiment, the clock correction module 32 and the parameter estimator 26 may access, use share or embody a main predictive filter 27. The main predictive filter 27 comprises a predictive filter, error reducing filter, or Kalman filter.

The communications module 34 provides software instructions for or is capable of supporting the distribution of the computed clock correction data 44 to user receivers (e.g., via a satellite communication system as illustrated in FIG. 1 or via wireless communication system).

In one embodiment, one or more precise satellite clocks (e.g., atomic clocks) on each satellite in orbit are used as a broadcast satellite clock, as a potential master satellite clock, or as the source of satellite clock data. One or more satellite clocks can be selected as the source of clock data for correction data or the position solution of the mobile location determining receiver 42. For example, a GPS satellite clock, a GLONASS satellite clock, or a hybrid of the of the GPS satellite clock and the GLONASS satellite clock can be selected as the source of clock data. In a first example, satellite clock data that is used in the clock correction data 44 comprises the median of the GPS satellite clock throughout the GPS constellation, or a material portion (e.g., majority or statistically significant sample size) of the constellation that serves a wide area. In a second example, the satellite clock data is used in the clock correction data 44 comprises the median of GLONASS satellite clock throughout the GLONASS constellation, or a material portion (e.g., majority or a statistically significant sample size) of the constellation that serves a wide area. In a third example, the satellite clock data is used in the clock correction data comprises the median of the GPS satellite clock through the GPS constellation and the median of the GLONASS satellite clock throughout the GLONASS constellation.

In accordance with one embodiment, the system and method for the adaptive broadcast master clock is well suited for elimination of the external precision clock frequency input (e.g., atomic receiver clock or atomic reference oscillator at the reference receiver 51) and reduction of the daily operation complexity and development cost of a global or wide area differential correction system. As used herein, the master clock shall refer to the clock reference satellite clock for the GPS constellation or the GLONASS constellation that has the median value of the clock error differences for any epoch, such that the master clock may change from one epoch to another. Because there is prodigious number of satellites as the source of possible clock data under the present method and system, the reliability of the clock data can be further enhanced. Another advantage of the system and method is to facilitate clock corrections or clock correction data 44 that have zero mean statistical values (e.g., or near zero mean statistical values) and correction drift rate that can be bounded in accordance with pre-established or predefined constraints.

Figure 2:
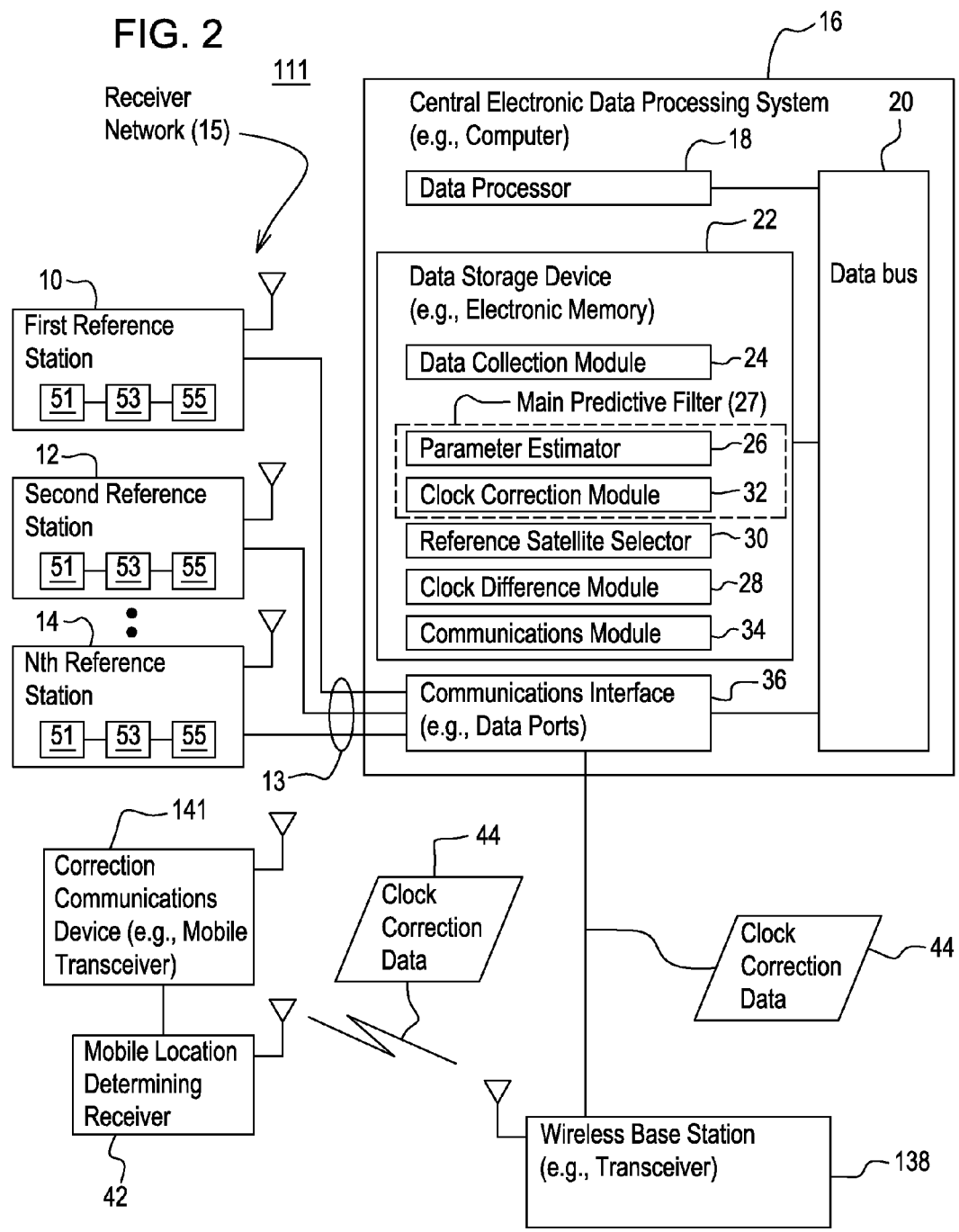
FIG. 2 is a block diagram of a second embodiment of a system for determining clock corrections.

The system 111 of FIG. 2 is similar to the system 11 of FIG. 1, except the system 111 of FIG. 2 replaces the ground-based satellite communications device 38 and the remote satellite communications device 40 with a wireless base station 138. The wireless base station 138 may represent part of a wireless communications network, for example. Further, the mobile location determining receiver 42 is associated with a correction communications device 141 that comprises a transceiver or wireless communications device (e.g., cellular, Global System for Mobile Communications (GSM) device, a code-division multiple access (CDMA) device or other wireless communications device) for communicating to the wireless base station 138. Like reference numbers in FIG. 1 and FIG. 2 indicate like elements.

In FIG. 2, the clock correction data 44 (e.g., clock error corrections) is transmitted and made available to one or more mobile location receivers 42 associated with respective correction communication devices 141 within a coverage area of the wireless base station 138 or network of wireless base stations 138.

Figure 3:
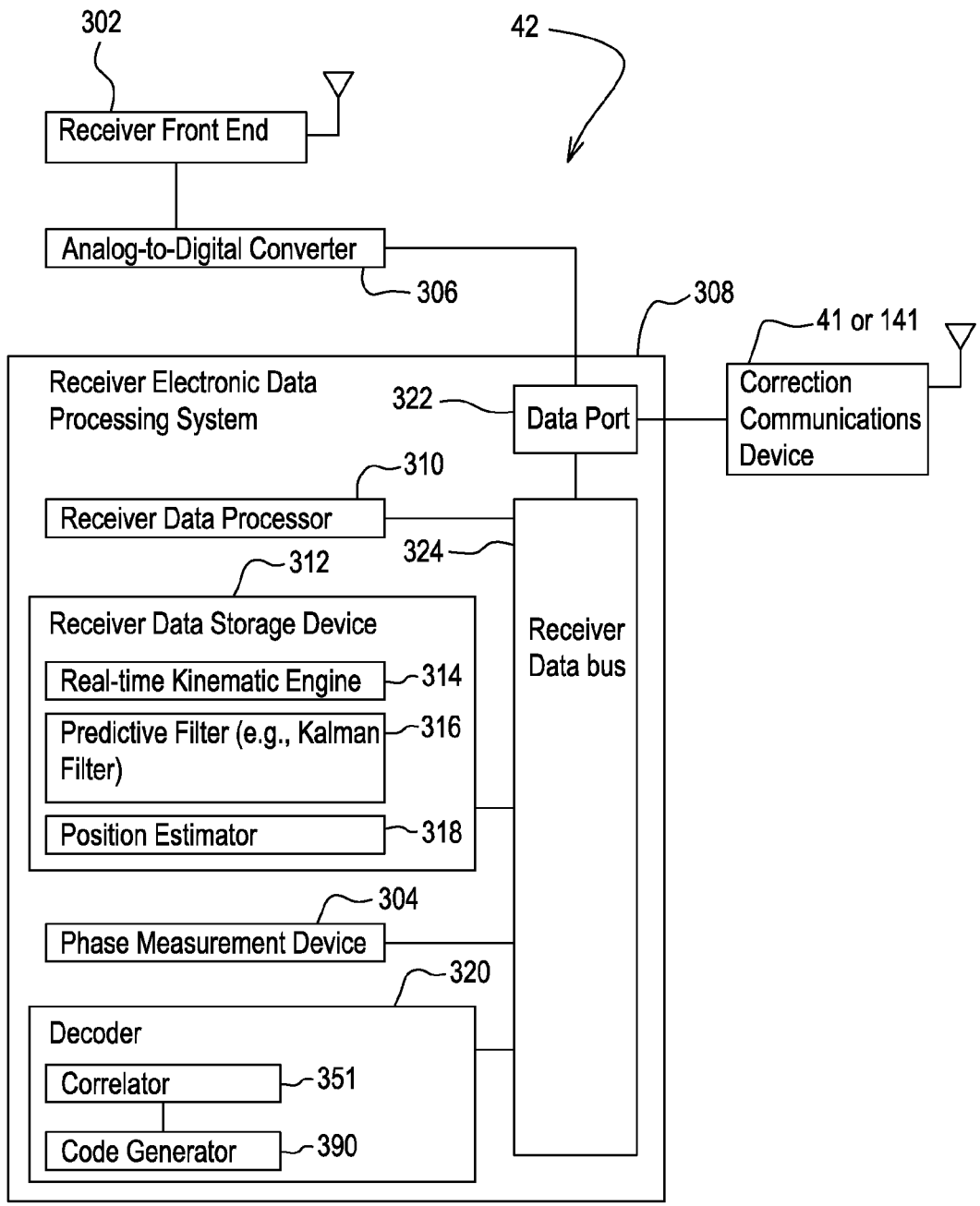
FIG. 3 is a block diagram of a mobile location-determining receiver in accordance with the system of FIG. 1 or FIG. 2.

FIG. 3 illustrates an example of the mobile location-determining receiver 42 that may be used in the embodiment of FIG. 1 or FIG. 2. The mobile location-determining receiver 42 comprises a receiver front end 302 coupled to an input of analog-to-digital converter 306. The output (e.g., digital baseband) of the analog-to-digital converter 306 is coupled to the receiver electronic data processing system 308.

The receiver electronic data processing system 308 comprises a receiver data processor 310, a receiver data storage device 312, a receiver data bus 324, a data port 322, a decoder 320, and a phase measurement device 304. The receiver data processor 310, the receiver data storage device 312, the data port 322, the phase measurement device 304, and the decoder 320 are coupled to the receiver data bus 324 to support communications between the foregoing components of the receiver electronic data processing system 308.

The receiver data processor 310 may comprise a microprocessor, a controller, a programmable logic array, an application specific integrated circuit, an arithmetic logic unit, a logic device, a data processing electronic device, or another device for executing software, logic, arithmetic, or program instructions.

The receiver data storage device 312 comprises electronic memory, an optical storage device, a magnetic storage device, or another storage device. The receiver data storage device 312 comprises a real-time kinematic engine 314, a predictive filter 316 (e.g., Kalman filter), and a position estimator 318.

The location-determining receiver 42 is associated with a correction communications device (41 or 141). The correction communications device (41 or 141) may be integrated into the location-determining receiver 42 or may communicate with the location-determining receiver via a data port 322. The correction communication device (41 or 141) receives correction data (e.g., clock error correction data (i.e., 44) and/or reference carrier phase correction data) from the central electronic data processing system 16 via one or more intermediary wireless or satellite communication devices (e.g., 38, 40 in FIG. 1, or 138 in FIG. 2).

The receiver front end 302 may comprise any suitable circuit for receiving satellite signals transmitted by one or more satellites (e.g., navigation satellites). The receiver front end 302 may be capable of receiving both GPS and GLONASS satellite signals, for example. The receiver front end 302 may comprise a spread-spectrum receiver or code division multiple access receiver (CDMA) that is capable of receiving multiple carriers transmitted by one or more satellites within a constellation of satellites. For example, the receiver front end 302 may comprise a preamplifier or amplifier for amplifying satellite signals, a mixer and a reference oscillator, where the amplifier input is coupled to an antenna, the amplifier output is coupled one mixer input, the reference oscillator is coupled to the other mixer input, and the mixer output is coupled to the receiver data processing system 308.

In one embodiment, the analog-to-digital converter 306 provides an interface between the receiver front end 302 and the receiver electronic data processing system 308. The analog-to-digital converter 306 converts analog phase measurements into digital carrier phase measurement data that can be processed or manipulated by the receiver electronic data processing system 308.

The decoder 320 determines pseudo range code measurements and provides the pseudo range code measurements to the receiver electronic processing system 308. In one embodiment, a decoder 320 comprises a demodulator or other device for demodulating the pseudo-random noise code (e.g., coarse acquisition code (C/A) or other more precise civilian or military coding) that modulates one or more carriers. For example, the decoder 320 may comprise a group of correlators 351 (e.g., one correlator per GPS channel and one correlator per GLONASS channel), where each correlator 351 is coupled to pseudo-random noise code generator 390 to provide a demodulated in-phase (I) and quadrature (Q) signal components (e.g., amplitude and phase or vectors). For GPS, the L1 carrier signal is modulated with the course acquisition (C/A) code and the encrypted precise code P(Y), whereas the L2 signal is modulated with the encrypted P(Y) code. In one embodiment, the decoder may comprise a code generator coupled to an input delay module, where an output of the delay module is coupled to a correlator for measuring the correlation between a reference pseudo random noise code, which is delayable by known increments by the delay module, and a received pseudo random noise code from a receiver front end 302. The decoder 320 may also facilitate decoding of the navigation information that modulates a carrier signal, such as ephemeris data.

The phase measurement device 304 comprises any device, integrated circuit, electronic module, or data processor for measuring the phase of a carrier signal. In one configuration, the phase measurement device 304 comprises a signal generator, a phase delay module coupled to a first correlator and second correlator. The phase measurement device measures or estimates the observed phase of one or more carrier signals provided by the receiver front end 302. The measured phase may be expressed in integer wavelengths of the carrier signal, fractional wavelengths of the carrier signal, and/or degrees of the carrier signal.

The phase measurement device 304 may determine one or more of the following: (1) a first measured phase component of fractional wavelengths of the first carrier signal, the second carrier signal or both, and (2) a second measured phase component of whole wavelengths of the first carrier signal, the second carrier signal or both. The latter second measured phase component may be determined by a counter (e.g., zero-crossing counter) that counts transitions of a received, reconstructed or processed carrier signal that intersect with an X axis at a reference magnitude (e.g., 0 voltage) in the time domain, where X represents time and the Y axis represents magnitude of the carrier signal. However, the phase measurement device 304 relies upon further processing in the receiver data processing system 308 to determine or resolve a whole cycle integer ambiguity that may cause the second measured phase component to be in error or offset by a whole number of wavelength cycles (e.g., to estimate a distance or range between a corresponding satellite and the location-determining receiver). The phase measurement device 304 determines and provides carrier phase measurement data to the receiver electronic processing system 308.

The real-time kinematic engine 314, the predictive filter 316, and the position estimator 318 may communicate with one another. The real-time kinematic engine 314, the predictive filter 316, and the position estimator 318 may communicate with one another via logical data paths, physical data paths, or both. A logical data path means a virtual data path or communication of data between software modules or between one or more software programs, for example. A physical data path means a transmission line or one or more receiver data buses 324 that support communications of data, logic level signals, electrical signals, or electromagnetic signals, for example.

In one embodiment, the real-time kinematic engine 314 comprises a search engine or other software instructions for searching for or determining an integer ambiguity solution sets for the phase of one or more received carrier signals from multiple satellites. The kinematic engine 314 may search the carrier phase data provided by the phase measurement device 304, for example. The integer ambiguity solutions sets refer to integer-cycle phase ambiguities in the received carrier phase of the received carrier signals (e.g., L1 signal at 1.57542 GHz, the L2 signal at 1.22760 GHz for GPS or similar signals) transmitted by one or more satellites, for example. The kinematic engine 314 or its search engine may use a least squares or Kalman filtering techniques to reduce the search space or reach one or more ambiguity set solutions for the integer-cycle phase ambiguities of the carrier signals transmitted from the satellites.

In one configuration, the predictive filter 316 (e.g., Kalman filter) facilitates searching by the search engine to more efficiently, quickly, or accurately reach an ambiguity set solution set solutions for the integer-cycle phase ambiguities of the carrier signals transmitted from the satellites. In an alternative embodiment, alternative non-search based techniques (e.g., wide-lane phase carrier combinations and data processing) may be used to resolve carrier phase integer ambiguity solution sets.

The estimator 318 comprises a receiver data processor 310 or other data processing device for estimating a position, velocity, attitude, or any of the foregoing attributes of an object or vehicle associated with the location-determining receiver 42. The estimator 318 is coupled to or communicates with the real time kinematic engine 314 and the receiver data processor 310. Once the integer ambiguity solutions set is determined, the position estimator 318 or location-determining receiver 42 can use the phase carrier measurement data to provide an accurate estimation of the distance or range between each satellite and the location-determining receiver based on the known propagation speed (i.e., speed of light). In turn, the ranges between three or more satellites and the location-determining receiver can be used to estimate the position, velocity or attitude of the receiver 42.

The predictive filter 316 comprises an error reduction filter, a Kalman filter or variant thereof for reducing or mitigating errors, such as measurement error. A Kalman filter may comprise a predictive filtering device or circuit that uses summation of signals, delay, and feedback to process data and compensate for the effects of noise and uncertainty in measured data or otherwise. Resetting or reinitialization may refer the same the reinitialization of the states of the error reducing or Kalman filter.

The position estimator 318 comprises an electronic module, a software module, or both for estimating a position of an object or vehicle associated with the location-determining receiver. The position estimator may use one or more of the following data sources to determine an estimated position or attitude of the antenna of the location determining receiver or an associated object or vehicle: the decoded pseudo random noise code, the carrier phase measurement data, the encrypted precise code (e.g., P(Y) code), the course acquisition code, navigation information, and integer-cycle phase ambiguity data, and reference station carrier phase data, where the reference station carrier phase data may be integrated in the integer-cycle phase ambiguity data.

The predictive filter 316 may comprise an error-reducing filter that receives input data from the real time kinematic engine 314, where the input data comprises ambiguity solution data (e.g., integer ambiguity set) for the corresponding carrier phase measurement data. In one embodiment, the reference receiver 51 in FIG. 1 and FIG. 2 may comprise substantially the same elements as the mobile location-determining receiver 42 of FIG. 3, except that the reference receiver 51 is not coupled to the correction communications device (41 or 141).

Figure 4:
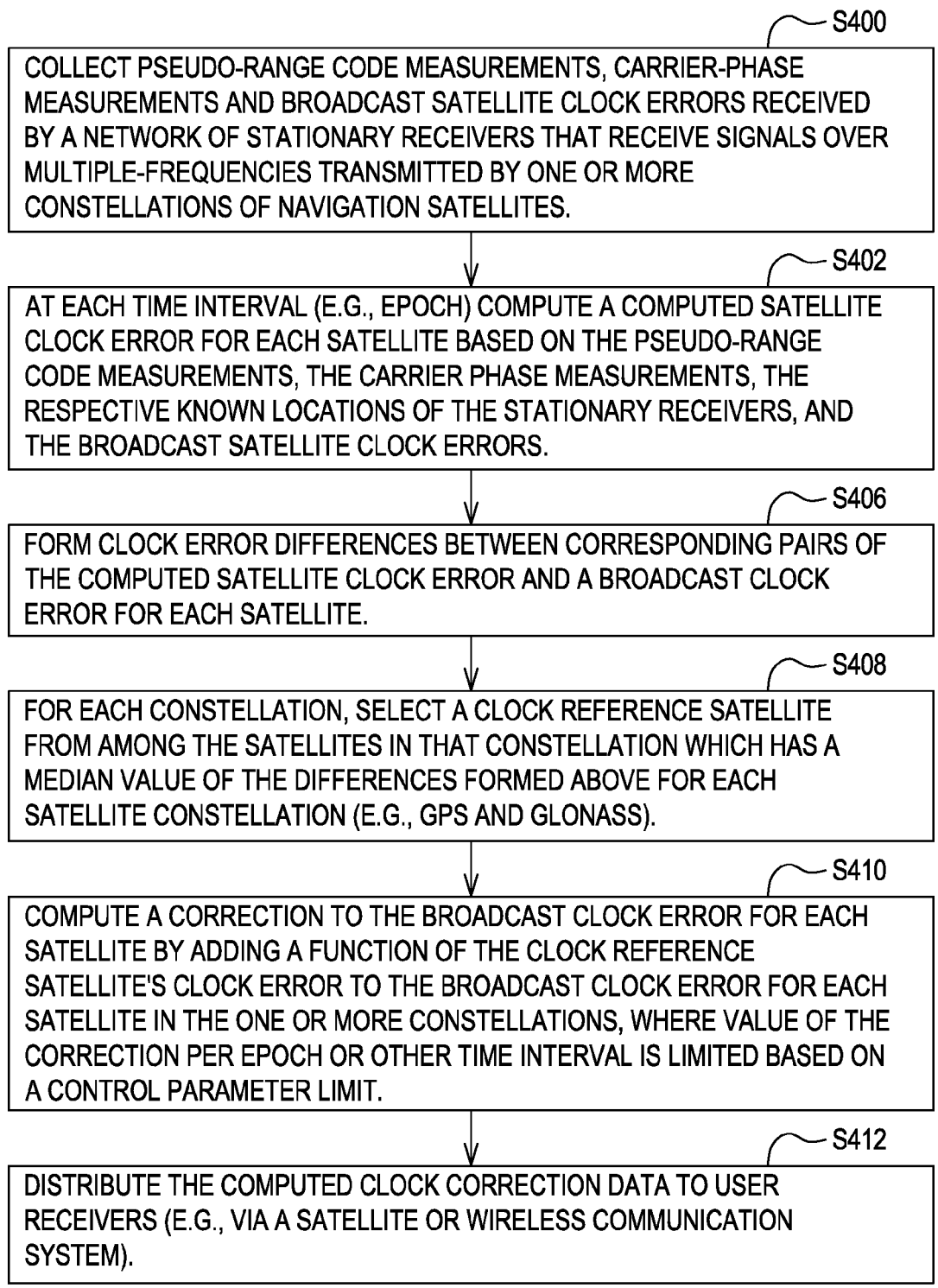
FIG. 4 is a first example of a flow chart of a method for determining clock error corrections in accordance with any embodiment of the system.

FIG. 4 is a first example of a flow chart of a method for determining clock correction data 44. The method of FIG. 4 begins in step S400.

In step S400, a data collection module 24 or central electronic data processing system 16 collects pseudo-range code measurements, carrier phase measurements, and broadcast clock errors received by a receiver network 15 of reference stations (e.g., 10, 12 and 14). For example, the receiver network 15 of reference stations comprise stationary reference receivers 51 located at respective known locations or at known geographic coordinates, where the reference receivers 51 receive signals over multiple frequencies (e.g., multiple carrier frequencies) transmitted by one or more constellations of the navigation satellites. The one or more constellations may comprise a GPS constellation, a GLONASS constellation, or another constellation of navigation satellites. For a GPS satellite constellation, the multiple frequencies may comprise the L1 carrier frequency and the L2 carrier frequency, for example. For GLONASS satellite constellation, multiple carrier frequencies are assigned to different satellites.

In the reference receiver 51, a phase measurement device or receiver data processing system 53 measures carrier phases of respective carrier signals received by the reference receiver 51. The carrier phase measurements may include GPS carrier phase measurement data and GLONASS carrier phase measurement data, for instance. A decoder in the reference receiver 51 may decode transmitted ephemeris data, broadcast satellite clock errors, and other navigation data that is transmitted on or that modulates at least one of the carrier signals of one or more satellite signals. In one configuration, the carrier phase measurements, the pseudo-range code measurements, and the navigation message data is transmitted from the network of receivers 15 to the central data processing system 16 via one or more communications links 13.

Each satellite typically broadcasts ephemeris data and satellite clock error data (e.g., differential clock data with respect to GPS system time or GLONASS system time for a particular satellite). The broadcast clock data is a set of second order polynomial fitting coefficients used by a receiver to correct the pseudo range and carrier phase measurements of a location-determining receiver (e.g., reference receiver 51). Each navigation satellite transmits ephemeris data about its own orbit and satellite clock. The accuracy of the broadcast satellite clock errors typically is within 2-3 meters level relative to GPS time, for example.

In step S402, at each time interval (e.g., epoch), the parameter estimator 26 or the central electronic data processing system 16 estimates computed satellite clock error data for each satellite based on one or more of the following collected data: the pseudo-range code measurements of the receiver network 15 for each satellite, the carrier phase measurements of the receiver network 15 for each satellite, the respective known locations of the stationary reference receivers 51 within the receiver network 15, and the broadcast satellite clock errors.

Step S402 may be carried out in accordance with various techniques that may be applied alternately or cumulatively. In accordance with first technique, at each time interval (e.g., epoch), the parameter estimator 26 or the central electronic data processing system 16 estimates satellite clock error data for each satellite, which is active or properly functioning in the one or more constellations (e.g., GPS, GLONASS or both), based on the pseudo-range code measurements, the carrier phase measurements, the respective known locations of the stationary receivers, and broadcast satellite clock errors or the navigation message data (e.g., which includes broadcast satellite clock errors).

In accordance with a second technique, if a satellite provides corrupt or unreliable satellite signals or corrupt or unreliable data for a certain time period, the parameter estimator 26 or central data processing system 16 may suspend processing of satellite clock error data for the defective or suspect satellite for a time period, until the received satellite signal has a sufficient signal quality or reliability level of the received data.

In accordance with a third technique, the parameter estimator 26 or the central electronic data processing system 16 uses a single difference procedure or another procedure to determine the computed satellite clock error data for each corresponding satellite in one or more constellations (e.g., GPS or GLONASS constellations). For example, in one embodiment each possible different receiver-pair, single-satellite combination or permutation that is available (e.g., received with adequate signal strength or signal quality at any pair of reference receivers 51) is used to estimate clock error or bias (e.g., computed satellite clock error) for each satellite in a particular constellation in accordance with repeated application of a single difference between carrier phase measurements of the reference receivers 51. The computed satellite clock error data may be expressed as differential time or bias with reference to the GPS system time or GLONASS system time.

In accordance with a fourth technique, the clock difference module 28 or the central electronic data processing system 16 uses a double difference procedure or another procedure to determine the computed satellite clock error data. For example, the double difference procedure refers to a difference between carrier phase measurements from two reference receivers 51 (e.g., at known fixed locations or geographic coordinates) that are substantially simultaneously receiving carrier signals from the same pair of two satellites to determine computed satellite clock error data with reduced clock error or bias. For example, in one embodiment each possible different receiver pair-satellite pair combination or permutation that is available (e.g., received with adequate signal strength or signal quality at any pair of reference receivers 51) is used to estimate clock error or bias for each satellite in a particular constellation in accordance with repeated application of a double difference between carrier phase measurements of the reference receivers 51. In practice, a double difference may be determined by taking a second difference of two single difference determinations. The computed satellite clock error data may be expressed as differential time or bias with reference to the GPS system time or GLONASS system time.

In step S406, the clock difference module 28 or the central electronic data processing system 16 forms or determines clock error differences (e.g., differential data or differential clock error data) between corresponding pairs of the computed satellite clock error data and corresponding broadcast clock data for each satellite. For example, the computed satellite clock error data is the satellite clock data that is consistent with the known fixed location of the reference receiver 51 at the particular reference station (e.g., 10, 12 or 14) and the carrier phase measurements of the particular reference station (e.g., 10, 12 or 14) for a certain satellite.

The broadcasted clock data is provided by or derived from the precise clocks (e.g., Rubidium, Cesium or atomic clocks) aboard each satellite. In one embodiment, the broadcasted clock data comprises differential clock data or a bias clock data with reference to a constellation system clock. In another embodiment, the broadcasted clock data represents the transmitted satellite clock data (and associated ephemeris data).

Step S406 may be executed in accordance with various techniques that may be applied separately or cumulatively.

In accordance with a first technique, the clock difference module 28, the central electronic data processing system 16, or a main predictive filter 27 (e.g., Kalman filter) in the data processing system 16 uses one or more of the following to solve for the clock error difference on a satellite-by-satellite basis for one or more constellations and for each successive epoch: (1) the respective computed satellite clock error data for one or more satellites in a common constellation, (2) respective broadcast satellite clock error data for the one or more satellites in the common constellation, and (3) respective broadcast satellite clock error data for the common constellation, as adjusted or corrected based on accompanying ephemeris data for a particular satellite. The common constellation refers to the same constellation of satellites, which may comprise a GPS constellation or a GLONASS constellation, for example.

In accordance with a second technique, the clock difference module 28 or data processing system 16 determines the differences or error data between the computed satellite clock error data and the broadcast clock error data for each satellite in each constellation on a satellite-by-satellite basis, or as otherwise limited to particular subsets of satellites within each constellation. The differences or error data may be stored in one or more arrays or matrices in the data storage device 22, where each array corresponds to a particular constellation.

In step S408, a reference satellite selector 30 or the electronic data processing system 16 selects one of the satellites within each constellation as the clock reference satellite for that constellation, where the clock reference satellite has the median value of the clock error differences (e.g., from step S406) for that constellation. In a first example for carrying out step S408, a reference satellite selector 30 or the electronic data processing system 16 selects one of the satellites within the GPS constellation as the clock reference satellite for the GPS constellation, where the clock reference satellite has the median value of the differential data or clock error data for the GPS constellation. In a second example for carrying out step S408, a reference satellite selector 30 or the electronic data processing system 16 selects one of the satellites within the GLONASS constellation as the clock reference satellite for the GLONASS constellation, where the clock reference satellite has the median value of the differential data or clock error data for the GLONASS constellation.

In step S410, the clock correction module 32 or the electronic data processing system 16 determines or computes the correction or correction data to the broadcast clock data by adjusting the broadcast clock error data of each satellite in the one or more constellations. For example, the clock correction module 32 or the data processing system 16 adjusts the broadcast clock error data of each satellite by adding a function of the clock reference satellite's clock error to the broadcast clock error for each satellite in the one or more constellations, where the value of the correction per epoch or other time interval (e.g., several adjacent epochs) is limited based on a control parameter limit.

Step S410 may be executed in accordance with various procedures that may be applied separately or cumulatively.

Under a first procedure, the control parameter limit is proportional to the clock reference satellite's clock error. Under a second procedure, the control parameter limit is less than or approximately equal to the clock reference satellite's clock error.

Under a third procedure, the control parameter limit comprises a fixed parameter, expressed in distance units, after a main predictive filter 27 (e.g., Kalman filter) converges on a solution for the correction to the broadcast satellite clock error.

Under a fourth procedure, for each respective navigation satellite in a first constellation in the one or more constellations, the computed correction is limited at each epoch to a first clock error of the clock reference satellite of the first constellation; and, for each respective navigation satellite in a second constellation in the one or more constellations, the computed correction is limited at each epoch to a second clock error of the clock reference satellite of the second constellation, where the first clock error is independent of the second clock error. For example, the first constellation may comprise a Global Positioning System constellation and wherein the second constellation may comprise a GLONASS constellation.

Under a fifth procedure, after convergence of a solution for the correction to the broadcast clock error, the computed correction is limited at each epoch to not exceed a threshold value. Under a sixth procedure, the threshold value is approximately one millimeter in distance units, or approximately 0.00333 nanoseconds in equivalent time units, where the conversion factor between distance units and time units is the speed of light (e.g., $3 \times 10^8$ meters per second). Under a seventh procedure, the clock reference satellite's clock error is applied as an additional constraint to a main predictive filter 27 (e.g., Kalman filter).

Under an eight procedure, the clock correction module 32 or the electronic data processing system 16 determines or computes the correction data to the broadcast clock error data by limiting the clock error correction to the broadcast clock error to a maximum clock correction amount per epoch or other time interval (e.g., multiple adjacent epochs) that is less than or equal to one or more of the following: (a) a corresponding maximum threshold (e.g., approximately equal to or less than 1 millimeter per epoch or another time interval, or approximately equal to or less than 0.00333 nanoseconds), (b) a root mean square error (RMS) in range estimate, or (c) a corresponding maximum threshold expressed in distance units or equivalent time units, where the speed of light is the conversion factor. For example, the change per unit time in the clock error correction data can be limited based on the navigation message data (e.g., ephemeris data and broadcast clock error data) such that the clock error correction data or temporal correction data of the location-determining receiver 42 is shifted less than a maximum displacement per unit time that would otherwise cause unwanted discontinuities, discrepancies, or inaccuracies in associated position estimates determined by the end user mobile location determining receiver 42.

Under a ninth procedure, at regular or periodic intervals (e.g., epochs) the clock correction module 32 or the electronic data processing system 16 determines the next clock error correction data to the broadcast clock error data by dynamically adjusting in real-time a change in clock error data per unit time that is less than or equal to a corresponding maximum threshold (e.g., less than approximately 1 millimeter per epoch or another time interval, or less than approximately 0.00333 nanoseconds per epoch or another time interval).

Under a tenth procedure, step S410 may be carried out by defining a control parameter limit on the change per unit time in the clock error correction data based on a median difference between pairs of the computed satellite clock error data and the broadcast clock error data (or the ephemeris clock data) within a particular constellation of navigation satellites. For example, step S410 may be carried out by limiting the clock error corrections (or maximum correction shift) determined by the central data processing system 16 or the clock correction module 32 for transmission to the location-determining receiver 42 as follows:

In Equation 1, the median GPS clock difference between the computed satellite clock error data from the parameter estimator 26 and ephemeris clock data or broadcast satellite clock error data received from the receiver network 15 can be determined as follows:

$$d\text{Clk}_{GPS}=\text{Median}(\text{clock}^i(\text{hub})-\text{clock}^i(\text{eph}))\,i=1{:}32 \text{ for GPS.} \quad (1)$$

where $d\text{Clk}_{GPS}$ is the median GPS clock difference for the GPS constellation, $\text{clock}^i(\text{hub})$ is the computed clock error data for the ith satellite, $\text{clock}^i(\text{eph})$ is the ephemeris clock data or broadcast clock error data for the ith satellite, and i is the satellite identifier of each of the 32 GPS satellites. In one embodiment, the computed satellite clock error data and the ephemeris clock data or broadcasted satellite clock error data is normalized to equivalent units and to the same or substantially same epoch prior to computation of the above median GPS clock difference for the GPS constellation. As later described in Equations 3 and 4, the above definition of the median GPS clock difference, $d\text{Clk}_{GPS}$ can be used by the data processing system 16, or its predictive filter (e.g., Kalman filter), for determining limits on the clock error correction data (e.g., clock error corrections), or the maximum change in the clock error correction data per unit time, or its application in the mobile location-determining receiver 42.

In Equation 2, the median GLONASS clock difference between the computed satellite clock error data from the parameter estimator 26 and ephemeris clock data or broadcast satellite clock error data received from the receiver network 15 can be determined as follows:

$$d\text{CLK}_{GLONASS}=\text{Median}(\text{clock}^j(\text{hub})-\text{clock}^j(\text{eph})),\,j=1{:}24 \text{ for GLONASS.} \quad (2)$$

where $d\text{CLK}_{GLONASS}$ is the median GLONASS clock difference for the GLONASS constellation, $\text{clock}^j(\text{hub})$ is the computed satellite clock error data for the jth satellite, $\text{clock}^j(\text{eph})$ is the ephemeris clock data or broadcasted satellite clock error data for the jth satellite, and j is the satellite identifier of each of the 24 GLONASS satellites.

In one embodiment, the computed satellite clock error data and the ephemeris clock data or broadcasted satellite clock error data is normalized to equivalent units and to the same or substantially the same epoch prior to computation of the above median GLONASS clock difference. As later described in Equations 3 and 4, the above definition of the median GLONASS clock difference, $d\text{Clk}_{GLONASS}$ can be used by the data processing system 16, or its main predictive filter 27 (e.g., Kalman filter), for determining limits on the clock correction data (e.g., clock error corrections), or the maximum change in the clock correction data per unit time, or its application in the mobile location-determining receiver 42.

In one embodiment, the data processing system 16, the clock correction module 32, or the predictive filter (e.g., Kalman filter) maintains or determines that clock error corrections are smooth or continuous (e.g., as possible or practicable) to avoid any possible correction discontinuity or jump in the clock error corrections; hence, dependent position of velocity estimates based on the clock error corrections at the mobile location determining receiver 42. The maximum clock change per unit time (e.g., per epoch or other time interval) of the constraint update (e.g., update to the correction data or state update of the predictive filter 27) in the parameter estimator 26, the correction module 32, or the predictive filter 27 (e.g., Kalman filter) at the central data processing system 16 should be bounded as the Eq. 3:

$$dX = \frac{H^T P}{H^T P H + R}(d\text{Clk}) <= \text{Threshold} \quad (3)$$

where dX is a state update to the clock correction estimate; H is the design matrix containing the sensitivity coefficients; P is the variance-covariance matrix; dClk is the clock reference satellite's clock error, Threshold is the threshold for the maximum correction change in displacement in distance units (e.g., 1 mm) or in equivalent time units; R is the variance of the applied correction data.

Based on Equation 3, the variance R or adaptive variance for broadcast master clock from GPS and GLONASS satellite can be reversely computed from the main predictive filter 27 (e.g., Kalman filter) or the parameter estimator 26, then the adaptive constraint (e.g., adaptive correction data for the adaptive master clock or the reference satellite clock for the GPS constellation or GLONASS constellation) can be applied into the main predictive filter 27 or the parameter estimator 26.

A threshold variance level, $T_R$, may be defined in accordance with the following Equation 4:

$$T_R = \frac{H^T P}{\text{Threshold}}(d\text{Clk}) - H^T P H, \quad (4)$$

where $T_R$ is the threshold variance level for R, and where the other parameters are defined above.

In one example, if the computed variance R is larger than the threshold variance level, $T_R$, the clock correction module 32 or the main predictive filter 27 uses the computed variance R to limit or update of the correction state or clock correction data (e.g., clock error corrections). In another example, if the computed variance R is smaller than the threshold variance level $T_R$, the clock correction module 32 or the predictive filter 27 uses the threshold variance level, $T_R$, to limit or update the correction data (e.g., clock error corrections).

In an alternate embodiment, threshold variance level, $T_R$, may comprise a predefined variance level or constant parameter that is user-definable, based on empirical studies of master clock performance, or based on historical accuracy of position estimates of the mobile location-determining receiver 42. For example, the threshold variance level may be preset or predefined as 0.01 m².

The median (e.g., GPS median or GLONASS median) of clock error difference between the parameter estimator 26 (e.g., hub orbit/clock estimator) and the broadcast clock error (e.g., ephemeris clock) received by the receiver network 15 improves reliability because some satellites can have abnormal, outlying or aberrational satellite clocks, at least occasionally. If a constraint inputted the main predictive filter 27 (e.g., Kalman filter) or the parameter estimator 26 is too tight or restricted, it can cause a significant correction data jump in the resultant correction data. If the constraint inputted into the main 27 predictive filter (e.g., Kalman filter) or parameter estimator 26 is too loose, it can cause slow drift in the resultant correction data and large variance for clock estimation due to unobservability between the satellite clock and the receiver clock (e.g., of the reference receiver 51). In order to overcome foregoing technical problems, in accordance with one embodiment an adaptive broadcast master clock is proposed in which the change in clock correction is limited within certain predetermined or predefined ranges.

In step S412, the communications module 34, the communications interface 36 or the data processing system 16 distributes or transmits the computed clock correction data 44 (e.g., clock error corrections) to mobile location determining receivers 42 (e.g., user location determining receivers) via a satellite, wireless or another communications system. In one example consistent with the system of FIG. 1, the data processing system 16 distributes or transmits the clock correction data 44 to via the ground-based satellite communications device 38 that provides a satellite up-link communications channel to the remote satellite communications device 40 on a satellite orbiting the Earth. The remote satellite communications device 40 provides a down-link channel in communication with the correction communications device 41 to receive the correction data for input to the mobile location-determining receiver 42.

In another example consistent with the system of FIG. 2, the data processing system 16 transmits the clock correction data 44 by the wireless base station 138 to the correction communications device 141 or transceiver associated with the mobile location-determining receiver 42.

In accordance with the system and method, the estimated parameters of all the satellite clocks and location-determining receiver clocks may be defined as relative to a constraint, called the master clock data or the clock reference satellite clock for the particular constellation. For a real-time global differential correction system or wide area correction system or any embodiment of the system and method disclosed herein, the electronic data processing system is well suited for producing smooth clock correction data (e.g., without transient jumps) and a well-bounded range of clock correction data to conserve bandwidth of communication links between portions of the differential correction system and to predict the clock corrections in real time with minimal processing delay.

Figure 5:
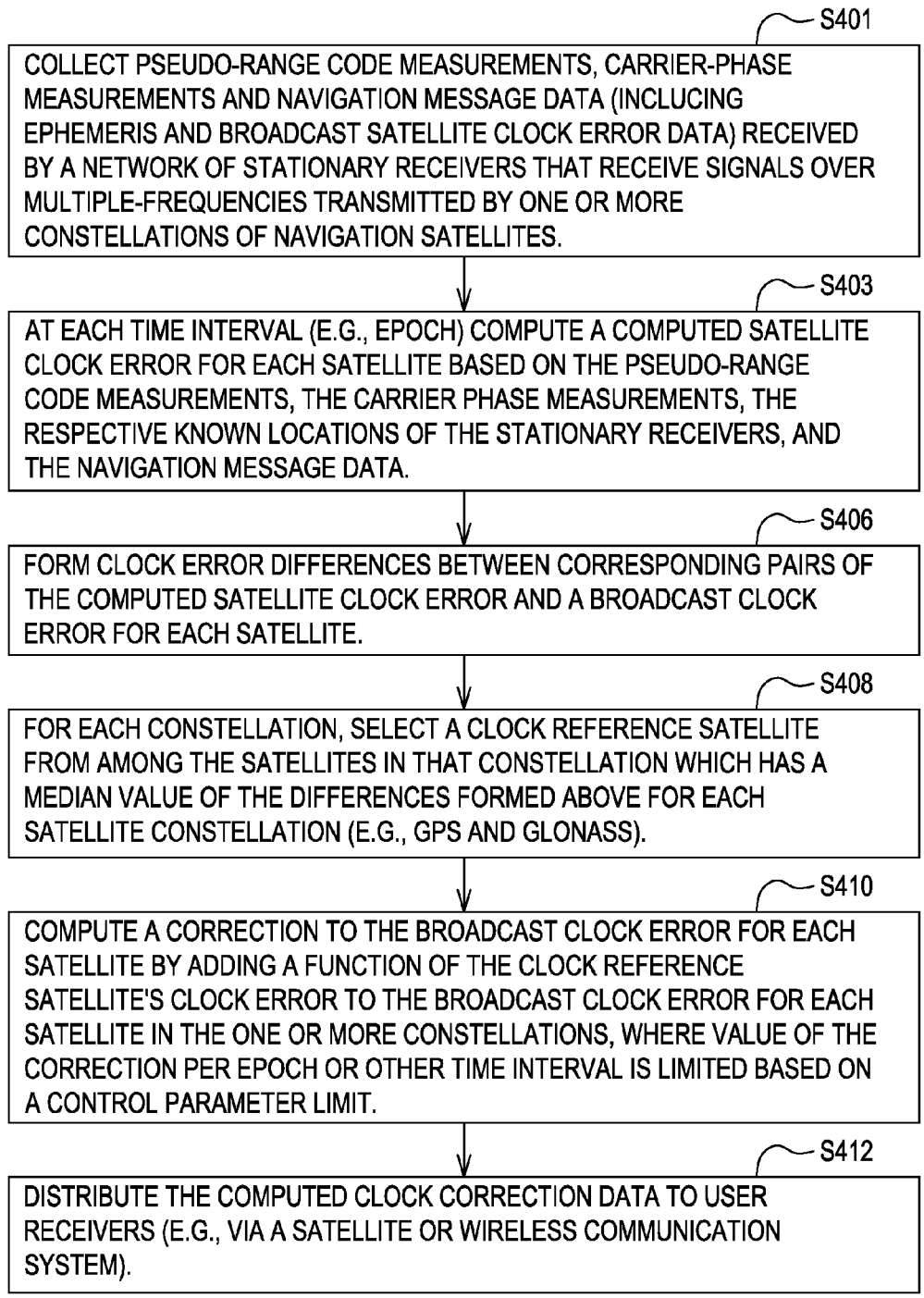
FIG. 5 is a second example of a flow chart of a method for determining clock error corrections in accordance with any embodiment of the system.

FIG. 5 is a second example of a flow chart of a method for determining clock correction data 44. Like reference numbers in FIG. 4 and FIG. 5 indicate like procedures or methods. The method of FIG. 5 begins in step S401.

In step S401, a data collection module 24 or central electronic data processing system 16 collects pseudo-range code measurements, carrier phase measurements, and navigation message data (e.g., ephemeris data and clock data) received by a receiver network 15 of reference stations (e.g., 10, 12 and 14). For example, the receiver network 15 of reference stations comprise stationary reference receivers 51 located at respective known locations or at known geographic coordinates, where the reference receivers 51 receive signals over multiple frequencies (e.g., multiple carrier frequencies) transmitted by one or more constellations of the navigation satellites. The one or more constellations may comprise a GPS constellation, a GLONASS constellation, or another constellation of navigation satellites. For a GPS satellite constellation, the multiple frequencies may comprise the L1 carrier frequency and the L2 carrier frequency, for example. For GLONASS satellite constellation, multiple carrier frequencies are assigned to different satellites.

In the reference receiver 51, a phase measurement device or receiver data processing system 53 measures carrier phases of respective carrier signals received by the reference receiver 51. The carrier phase measurements may include GPS carrier phase measurement data and GLONASS carrier phase measurement data, for instance. A decoder in the reference receiver 51 may decode transmitted ephemeris data, satellite clock data, and other navigation data that is transmitted on or that modulates at least one of the carrier signals of one or more satellite signals. The carrier phase measurements, the pseudo-range code measurements, and the navigation message data is transmitted from the network of receivers 15 to the central data processing system 16 via one or more communications links 13.

Each satellite typically broadcasts broadcast ephemeris data and broadcasted satellite clock error data (e.g., differential clock data with respect to GPS system time or GLONASS system time for a particular satellite). The broadcast ephemeris data is a set of second order polynomial fitting coefficients used by a receiver to predict receiver clock behavior of a location-determining receiver (e.g., reference receiver 51). Each navigation satellite transmits ephemeris data about its own orbit and satellite clock. The accuracy of the broadcast ephemeris clocks typically is within 2-3 meters level relative to GPS time, for example.

In step S403, at each time interval (e.g., epoch), the parameter estimator 26 or the central electronic data processing system 16 estimates computed satellite clock error data for each satellite based on one or more of the following collected data: the pseudo-range code measurements of the receiver network 15 for each satellite, the carrier phase measurements of the receiver network 15 for each satellite, the respective known locations of the stationary reference receivers 51 within the receiver network 15, and the navigation message data (e.g., ephemeris data and broadcast satellite clock error data).

Step S403 may be carried out in accordance with various techniques that may be applied alternately or cumulatively. In accordance with first technique, at each time interval (e.g., epoch), the parameter estimator 26 or the central electronic data processing system 16 estimates satellite clock error data for each satellite, which is active or properly functioning in the one or more constellations (e.g., GPS, GLONASS or both), based on the pseudo-range code measurements, the carrier phase measurements, the respective known locations of the stationary receivers, and the navigation message data.

In accordance with a second technique, if a satellite provides corrupt or unreliable satellite signals or corrupt or unreliable data for a certain time period, the parameter estimator 26 or central data processing system 16 may suspend processing of satellite clock error data for the defective or suspect satellite for a time period, until the received satellite signal has a sufficient signal quality or reliability level of the received data.

In accordance with a third technique, the parameter estimator 26 or the central electronic data processing system 16 uses a single difference procedure to determine the computed satellite clock error data for each corresponding satellite in one or more constellations (e.g., GPS or GLONASS constellations). For example, a single difference procedure refers to a difference between carrier phase measurements from two reference receivers 51 (e.g., at known fixed locations or geographic coordinates) that are substantially simultaneously receiving carrier signals from the same satellites to determine computed satellite clock error data with reduced clock error or bias. The computed satellite clock error data may be expressed as differential time or bias with reference to the GPS system time or GLONASS system time.

In accordance with a fourth technique, the clock difference module 28 or the central electronic data processing system 16 uses a double difference procedure to determine the computed satellite clock error data. For example, the double difference procedure refers to a difference between carrier phase measurements from two reference receivers (e.g., at known fixed locations or geographic coordinates) that are substantially simultaneously receiving carrier signals from the same pair of two satellites to determine computed satellite clock error data with reduced clock error or bias. In practice, a double difference may be determined by taking a second difference of two single difference determinations, where the single difference refers to a difference between carrier phase measurements from two reference receivers 51 (e.g., at known fixed locations or geographic coordinates) that are substantially simultaneously receiving carrier signals from the same satellites to determine computed satellite clock error data with reduced clock error or bias. The computed satellite clock error data may be expressed as differential time or bias with reference to the GPS system time or GLONASS system time.

The other steps or procedures in FIG. 5, including steps S406, S408, S410 and S412, are identical to or substantially similar to those set forth in the method of FIG. 4.

Figure 6:
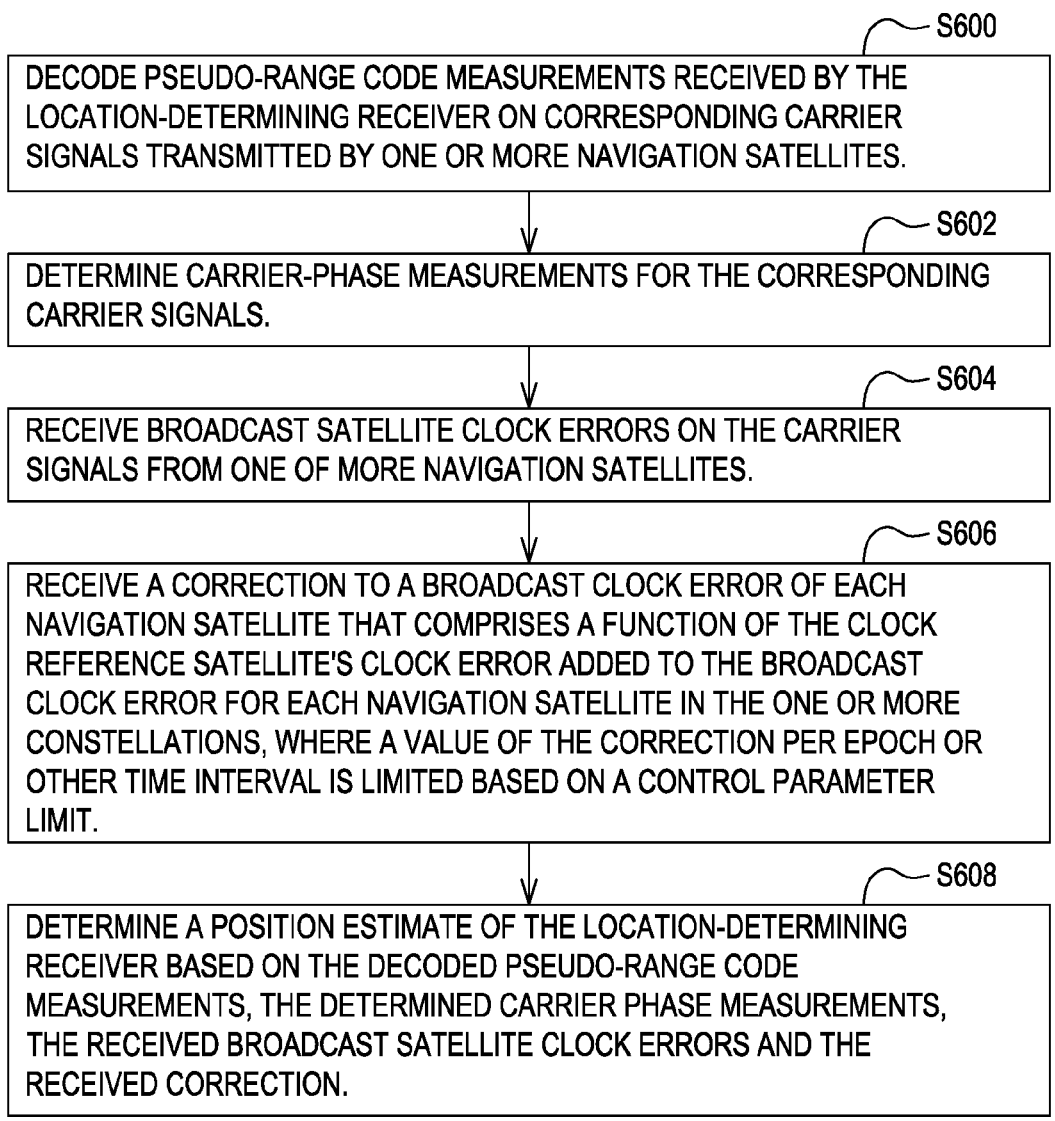
FIG. 6 is a flow chart of a method for determining a position estimate or velocity estimate at a receiver that receives clock error corrections.

FIG. 6 is a flow chart of a method for determining a position estimate or velocity estimate at a receiver that receives clock error corrections. The method of FIG. 6 begins in step S600. The method of FIG. 6 may use the embodiment of the location-determining receiver illustrated in FIG. 3 or another configuration of a location-determining receiver that is capable of receiving and using clock error corrections to provide more accurate position estimates than would otherwise be possible.

In step S600, a decoder 320 or receiver electronic data processing system 308 decodes pseudo-range code measurements received by the location-determining receiver 42 on corresponding carrier signals transmitted by one or more navigation satellites.

In step S602, a phase measurement device 304 or receiver electronic data processing system 308 determines carrier-phase measurements for the corresponding carrier signals.

In step S604, a decoder 320 or receiver electronic data processing system 308 receives broadcast satellite clock errors on the carrier signals from one or more navigation satellites.

In step S606, a correction communications device (41 or 141) or data port 322 of the receiver electronic data processing system 308 receives a correction to a broadcast clock error of each navigation satellite that comprises a function of the clock reference satellite's clock error added to the broadcast clock error for each navigation satellite in the one or more constellations, where a value of the correction per epoch is limited based on a control parameter limit.

In step S608, a data processing system 308 or position estimator 318 determines a position estimate of the location-determining receiver based on the decoded pseudo-range code measurements, the determined carrier phase measurements, the received broadcast satellite clock errors and the received correction. For example, the data processing system 308 or position estimator 318 may resolve phase ambiguities or integer phase ambiguities the determined carrier phase measurements to arrive at a location estimate consistent with the received correction to the broadcast clock error.

Step S608 may be carried out in accordance with various techniques, which may be applied separately or cumulatively.

Under a first technique, the data processing system 308 or the position estimator 318 may determine a position estimate and a velocity estimate of the location-determining receiver based on the decoded pseudo-range code measurements, the determined carrier phase measurements, the received broadcast satellite clock errors and the received clock error corrections (e.g., on an epoch by epoch basis).

Under a second technique, the control parameter limit is proportional to the clock reference satellite's clock error. Under a third technique, the control parameter limit is less than or approximately equal to the clock reference satellite's clock error. Under a fourth technique, the change in the correction or a clock correction per epoch or other time interval (e.g., multiple adjacent epochs) is limited by the following equation:

$$dX = \frac{H^T P}{H^T P H + R}(dClk) <= \text{Threshold}$$

where dX is the state update to the clock correction estimate; H is the design matrix with sensitivity coefficients; P is the variance-covariance matrix; R is the variance of the applied correction data; dClk is clock reference satellite's clock error; and Threshold is the maximum correction change allowed per epoch as defined in claim Under a fifth technique, if a computed variance R of the applied correction data is larger than the value $T_R$ given below, the computed variance R is used for the update of the correction state.

$$T_R = \frac{H^T P}{\text{Threshold}}(dClk) - H^T P H$$

Under a sixth technique, if the computed variance R is smaller than the value $T_R$, $T_R$ is used in place of R for the update of the correction state in accordance with the equations provided under the fourth and fifth techniques.

Having described the preferred embodiment, it will become apparent that various modifications can be made without departing from the scope of the invention as defined in the accompanying claims.

The following is claimed:

1. A method of determining satellite clock corrections to allow at least one location-determining receiver to provide at least one of a position estimate or a velocity estimate or a time estimate, the method comprising:
    collecting pseudo-range code measurements, carrier-phase measurements, and broadcast satellite clock errors from a network of stationary receivers of satellite signals transmitted by one or more constellations of navigation satellites;
    at each epoch, computing a computed satellite clock error for each navigation satellite based on the pseudo-range code measurements, the carrier phase measurements, and the broadcast satellite clock errors;
    forming clock error differences between corresponding pairs of the computed satellite clock error and a broadcast satellite clock error for each navigation satellite;
    for each constellation, selecting a clock reference satellite, from among the navigation satellites in that constellation, that has a median value of the clock error differences for that satellite constellation; and
    computing a correction to the broadcast clock error of each navigation satellite by adding a function of the clock reference satellite's clock error to the broadcast clock error for each navigation satellite in the one or more constellations, where a value of the correction per epoch or other time interval is limited based on a control parameter limit.

2. The method according to claim 1 wherein the control parameter limit is proportional to the clock reference satellite's clock error.

3. The method according to claim 1 wherein the control parameter limit is less than or approximately equal to the clock reference satellite's clock error.

4. The method according to claim 1 wherein the control parameter limit comprises a fixed parameter, expressed in distance or time units, after a predictive filter converges on a solution for the correction to the broadcast satellite clock error.

5. The method according to claim 1 wherein, for each respective navigation satellite in a first constellation in the one or more constellations, the computed correction is limited at each epoch to a first clock error of the clock reference satellite of the first constellation; and, wherein for each respective navigation satellite in a second constellation in the one or more constellations, the computed correction is limited at each epoch to a second clock error of the clock reference satellite of the second constellation, the first clock error being independent of the second clock error.

6. The method according to claim 5 wherein the first constellation comprises a Global Positioning System constellation and wherein the second constellation comprises a GLONASS constellation.

7. The method according to claim 1 wherein after convergence of a solution for the correction to the broadcast clock error, the computed correction is limited at each epoch to not exceed a threshold value.

8. The method according to claim 7 wherein the threshold value is approximately one millimeter or equivalent time threshold.

9. The method according to claim 1 wherein applying the clock reference satellite's clock error as the control parameter limit is implemented as an additional constraint to a predictive filter.

10. The method according to claim 1 wherein the change in the correction or a clock correction per epoch is limited by the following equation:

$$dX = \frac{H^T P}{H^T P H + R}(dClk) <= \text{Threshold}$$

where dX is the state update to the clock correction estimate; H is the design matrix with sensitivity coefficients; P is the variance-covariance matrix; R is the variance of the applied correction data; dClk is clock reference satellite's clock error; and Threshold is the maximum correction change per epoch or the control parameter limit.

11. The method according to claim 1, wherein if a computed variance of the correction data, R, of the applied correction data is larger than a threshold variance level, $T_R$, the computed variance, R, is used for the update of the correction state, consistent with the following equation:

$$T_R = \frac{H^T P}{\text{Threshold}}(dClk) - H^T P H$$

where H is a design matrix with sensitivity coefficients; P is a variance-covariance matrix; dClk is the clock reference satellite's clock error; and Threshold is a maximum correction change per epoch or the control parameter limit.

12. The method according to claim 1, wherein if the computed variance R is smaller than a threshold variance level, $T_R$, $T_R$ is used in place of R for the update of the correction state, consistent with the following equation:

$$T_R = \frac{H^T P}{\text{Threshold}}(dClk) - H^T P H$$

where H is a design matrix with sensitivity coefficients; P is a variance-covariance matrix; dClk is the clock reference satellite's clock error; and Threshold is a maximum correction change per epoch or the control parameter limit.

13. A system of determining satellite clock corrections to allow at least one location-determining receiver to provide at least one of a position estimate or a velocity estimate or a time estimate, the system comprising:
 a data collection module for collecting pseudo-range code measurements, carrier-phase measurements, and broadcast clock errors from a network of stationary receivers of satellite signals transmitted by one or more constellations of navigation satellites;
 a parameter estimator for computing a computed satellite clock error for each navigation satellite based on the pseudo-range code measurements, the carrier phase measurements, and the broadcast clock errors;
 a clock difference module for forming clock error differences between corresponding pairs of the computed satellite clock error data and a corresponding broadcast clock data for each navigation satellite;
 a reference satellite selector for selecting a clock reference satellite among the navigation satellites that has a median value of clock error differences for that satellite constellation; and
 a clock correction module for computing a correction for the broadcast clock error by adding a function of the clock reference satellite's clock error to the broadcast clock error for each navigation satellite in the one or more constellations, where a value of the correction per epoch or other time interval is limited based on a control parameter limit.

14. The system according to claim 13 wherein the control parameter limit is proportional to the clock reference satellite's clock error.

15. The system according to claim 13 wherein the control parameter limit is less than or approximately equal to the clock reference satellite's clock error.

16. The system according to claim 13 wherein the control parameter limit comprises a fixed parameter, expressed in distance units or time units, after a predictive filter converges on a solution for the correction to the broadcast satellite clock error.

17. The system according to claim 13 wherein, for each respective navigation satellite in a first constellation in the one or more constellations, the computed correction is limited at each epoch to a first clock error of the clock reference satellite of the first constellation; and, wherein for each respective navigation satellite in a second constellation in the one or more constellations, the computed correction is limited at each epoch to a second clock error of the clock reference satellite of the second constellation, the first clock error being independent of the second clock error.

18. The system according to claim 17 wherein the first constellation comprises a Global Positioning System constellation and wherein the second constellation comprises a GLONASS constellation.

19. The system according to claim 13 wherein after convergence of a solution for the correction to the broadcast clock error, the computed correction is limited at each epoch to not exceed a threshold value.

20. The system according to claim 19 wherein the threshold value is approximately one millimeter or equivalent time threshold.

21. The system according to claim 13 wherein the correction module comprises a predictive filter adapted to receive the clock reference satellite's clock error as an additional constraint.

22. The system according to claim 13 wherein the change in the correction or a clock correction per epoch is limited by the following equation:

$$dX = \frac{H^T P}{H^T P H + R}(dClk) <= \text{Threshold}$$

where dX is the state update to the clock correction estimate; H is the design matrix with sensitivity coefficients; P is the variance-covariance matrix; R is the variance of the applied correction data; dClk is a clock reference satellite's clock error; and Threshold is a maximum correction change per epoch or the control parameter limit.

23. The system according to claim 13, wherein, in a main predictive filter of the clock correction module, if a computed variance of the correction data, R, of the applied correction data is larger than a threshold variance level, $T_R$, the computed variance, R, is used for the update of the correction state, consistent with the following equation:

$$T_R = \frac{H^T P}{\text{Threshold}}(dClk) - H^T PH,$$

where H is a design matrix with sensitivity coefficients; P is a variance-covariance matrix; dClk is clock reference satellite's clock error; and Threshold is a maximum correction change per epoch or the control parameter limit.

24. The system according to claim 13, wherein, in a main predictive filter of the clock correction module, if the computed variance R is smaller than a threshold variance level, $T_R$, $T_R$ is used in place of R for the update of the correction state, consistent with the following equation:

$$T_R = \frac{H^T P}{\text{Threshold}}(dClk) - H^T PH$$

where H is a design matrix with sensitivity coefficients; P is the variance-covariance matrix; dClk is clock reference satellite's clock error; and Threshold is the maximum correction change per epoch or the control parameter limit.

25. The system according to claim 13 wherein the correction module comprises a predictive filter, wherein upon initialization of the predictive filter the correction data for the broadcasted clock data, the computed correction data is limited to a maximum value per the time interval that does not exceed a clock error of the clock reference satellite.

* * * * *